US011908602B2

(12) United States Patent
Lavesson et al.

(10) Patent No.: US 11,908,602 B2
(45) Date of Patent: Feb. 20, 2024

(54) STATIC ELECTRIC INDUCTION ARRANGEMENT

(71) Applicant: HITACHI ENERGY LTD, Zürich (CH)

(72) Inventors: Nils Lavesson, Västerås (SE); Tor Laneryd, Enköping (SE); Jan Czyzewski, Cracow (PL); Johan Dahlgren, Ludvika (SE); Sebastian Seier, Bad Honnef (DE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/015,165

(22) PCT Filed: Jun. 29, 2021

(86) PCT No.: PCT/EP2021/067892
§ 371 (c)(1),
(2) Date: Jan. 9, 2023

(87) PCT Pub. No.: WO2022/012925
PCT Pub. Date: Jan. 20, 2022

(65) Prior Publication Data

US 2023/0197325 A1 Jun. 22, 2023

(30) Foreign Application Priority Data

Jul. 13, 2020 (EP) .................................... 20185555

(51) Int. Cl.
*H01F 27/10* (2006.01)
*H01F 27/02* (2006.01)

(52) U.S. Cl.
CPC ......... *H01F 27/025* (2013.01); *H01F 27/105* (2013.01)

(58) Field of Classification Search
CPC .. H01F 27/12; H01F 27/402; H01F 2027/406; H01F 2027/404; H01F 27/02;
(Continued)

(56) References Cited

U.S. PATENT DOCUMENTS 1,957,245 A * 5/1934 Burnham ................ H01F 27/12 165/47
2,917,701 A * 12/1959 Salton ..................... H01F 27/12 361/37
(Continued)

FOREIGN PATENT DOCUMENTS

CN 105723478 A 6/2016
CN 106165558 A 11/2016
(Continued)

OTHER PUBLICATIONS

International Search Report and Written Opinion of the International Searching Authority, PCT/EP2021/067892, dated Sep. 30, 2021, 14 pages.
(Continued)

*Primary Examiner* — Tuyen T Nguyen
(74) *Attorney, Agent, or Firm* — Sage Patent Group

(57) ABSTRACT

Provided is a static electric induction arrangement including: a static electric induction device arranged in a static electric induction device tank; an accessory tank including at least one opening configured to receive an accessory therein; the static electric induction device tank and the accessory tank are intended to be filled with dielectric fluid and are connected via a fluid connection, an upper portion of a cross section of the fluid connection, is located at a first height, the arrangement comprises a heat exchanger connected to the device tank, the device tank includes an outlet that is
(Continued)

arranged to lead the dielectric fluid to the heat exchanger and an inlet that is arranged to return the dielectric fluid from the heat exchanger.

13 Claims, 3 Drawing Sheets

(58) Field of Classification Search
CPC ........ H01F 27/025; H01F 27/08; H01F 27/10; H01F 27/18; F02C 7/12; F03D 80/60; F05B 2260/221; F28D 2021/0031; F28D 1/0477; F28D 7/08; H02H 7/04
See application file for complete search history.

(56) References Cited

U.S. PATENT DOCUMENTS

| | | | | |
|---|---|---|---|---|
| 10,586,645 | B2 * | 3/2020 | Siefker | G01M 3/3245 |
| 2003/0057086 | A1 | 3/2003 | McLaine | |
| 2011/0043999 | A1 * | 2/2011 | Johnston | H01F 27/40<br>361/699 |
| 2016/0118186 | A1 * | 4/2016 | Frimpong | G01H 1/10<br>307/119 |

FOREIGN PATENT DOCUMENTS

| | | | | | |
|---|---|---|---|---|---|
| DE | 102008032375 | A1 | * | 1/2009 | H01F 27/105 |
| DE | 102017223817 | A1 | * | 6/2019 | H01F 27/04 |
| EP | 3057112 | A1 | | 8/2016 | |
| EP | 3131104 | A1 | | 2/2017 | |
| EP | 2851912 | B1 | | 6/2020 | |
| JP | 55117211 | A | * | 9/1980 | |
| JP | S56-43123 | U | | 4/1981 | |
| JP | S59-166426 | U | | 11/1984 | |
| JP | 61228605 | A | * | 10/1986 | H01F 27/12 |
| JP | S61-228604 | A | | 10/1986 | |
| JP | S61-228605 | A | | 10/1986 | |
| JP | H09-106919 | A | | 4/1997 | |
| JP | 2007-266065 | A | | 10/2007 | |
| JP | 4170684 | B2 | * | 10/2008 | |
| JP | 2013-219220 | A | | 10/2013 | |
| JP | 59-12789 | B2 | | 4/2016 | |
| JP | 2017168544 | A | | 9/2017 | |
| JP | 2020021907 | A | | 2/2020 | |
| KR | 101239303 | B1 | | 3/2013 | |
| KR | 20150044023 | A | | 4/2015 | |
| WO | 2000019457 | A1 | | 4/2000 | |
| WO | 2020108869 | A1 | | 6/2020 | |

OTHER PUBLICATIONS

Extended European Search Repot, EP 20185555.8, dated Jan. 11, 2021, 21 pages.
Office Action, Chinese Patent Application No. 202180049706.5, dated May 19, 2023, 6 pages.
Examination Report, Indian Patent Application No. 202347001973, dated Apr. 17, 2023, 5 pages.
Korean Patent Application No. 10-2023-7000897, Decision to Grant dated Feb. 1, 2023, 4 pages.

* cited by examiner

STATIC ELECTRIC INDUCTION ARRANGEMENT

CROSS REFERENCE TO RELATED APPLICATIONS

This application is a 35 U.S.C. § 371 national stage application of PCT International Application No. PCT/EP2021/067892 filed on Jun. 29, 2021, which in turns claims foreign priority to European Patent Application No. 20185555.8, filed on Jul. 13, 2020, the disclosures and content of which are incorporated by reference herein in their entirety.

TECHNICAL FIELD

The invention relates to a static electric induction arrangement, an application comprising a static electric induction arrangement and to a method to limit or prevent overheating of an accessory in a static electric induction arrangement.

BACKGROUND OF THE INVENTION

Static electric induction devices, such as transformers and shunt reactors, are often arranged within a tank filled with dielectric fluid. The dielectric fluid is used as an insulation medium and the dielectric fluid is also used as a cooling medium. The dielectric fluid may be a mineral oil or an ester. Static electric induction arrangements, such as transformers, may include accessories, such as bushings. Static electric induction devices, such as transformers, generate heat. Generation of heat in the transformer may be due to various losses, such as hysteresis, eddy current, iron and copper loss. If the heat in the transformer tank increases rapidly it may degrade the insulation material of the transformer and/or the insulation material of the bushing. Such degrading of the insulation material of the transformer and/or insulation material of the bushing may decrease the life time of the transformer arrangement, the efficiency of the transformer may decrease and there is also a risk of failure of the transformer arrangement.

JP2013219220 discloses a transformer arrangement in which a bushing is arranged in a bushing storage part wherein e.g. a sealed space chamber is formed between a transformer tank container and the bushing storage part and the material of the tank container is made to have a smaller thermal conductivity than the material of the bushing accommodation portion, so that heat cannot be easily transmitted to the bushing storage part.

SUMMARY OF THE INVENTION

It is desired to design a static electric induction arrangement including accessories which may be sensitive to high temperature. Further, it is desired to design a static electric induction arrangement with lower weight and volume.

It is an object with the present invention to alleviate at least some of the problems discussed above, and to provide advantages and aspects not provided by hitherto known technique.

It is an object with the present invention to provide an improved static electric induction arrangement, for example a static electric induction arrangement in which accessories without high-temperature qualification may be used in a static electric induction device configured for high temperature operation, or for extending the lifetime of the accessories. Further, it is an object with the present invention to provide a static electric induction arrangement with low weight and volume.

It is also an object to limit or prevent overheating of an accessory in a static electric induction arrangement.

The object(s) is/are achieved by the subject-matter of claim 1.

Thus, a static electric induction arrangement is disclosed, comprising:

a static electric induction device tank comprising a top part or a ceiling, a bottom part and at least one wall extending between the top part and the bottom part, which is intended to be filled with dielectric fluid;

an accessory tank comprising a top part or a ceiling, a bottom part and at least one wall extending between the top part and the bottom part, which is intended to be filled with dielectric fluid, the accessory tank further comprising at least one opening configured to receive an accessory therein;

a static electric induction device arranged in the static electric induction device tank, wherein the static electric induction device tank and the accessory tank are connected via a fluid connection, wherein an upper portion of a cross section of the fluid connection, as seen with respect to a vertical direction of the static electric induction arrangement, is located at a first height, wherein the arrangement comprises a heat exchanger connected to the static electric induction device tank, the static electric induction device tank comprises an outlet that is arranged to lead the dielectric fluid to the heat exchanger and an inlet that is arranged to return the dielectric fluid from the heat exchanger to the static electric induction device tank, wherein the inlet is located at the same height or vertically above the first height, as seen with respect to the vertical direction.

By the provision of the static electric induction arrangement as disclosed herein, an accessory which withstands lower temperatures may be used even if higher temperatures are reached in the static electric induction tank and thereby more temperature sensitive accessories may be used. In addition, the accessory will be less likely to fail, and it will reduce the impact of a failure of the accessory. The reliability of the static electric induction arrangement will be supported. Further, a static electric induction arrangement having a lower weight and volume may also be obtained.

According to an example embodiment the static electric induction arrangement comprises an accessory arranged in the at least one opening of the accessory tank.

The static electric induction device may be a transformer or a shunt reactor.

According to an example embodiment, the static electric induction arrangement comprises the dielectric fluid.

The dielectric fluid may be an ester, an isoparaffinic liquid or an oil, such as a mineral oil.

The present invention also provides a method to limit or prevent overheating of an accessory in a static electric induction arrangement, wherein the method comprises the steps of:

providing a static electric induction device tank, comprising a top part, a bottom part and at least one wall extending between the top part and the bottom part, which is intended to be filled with dielectric fluid;

providing an accessory tank, comprising a top part, a bottom part and at least one wall extending between the top part and the bottom part, which is intended to be filled with dielectric fluid, providing at least one opening in the accessory tank wherein the opening is configured to receive an accessory therein;

providing a static electric induction device arranged in the static electric induction device tank;

providing a fluid connection between the static electric induction device tank and the accessory tank, and as seen with respect to a vertical direction of the static electric induction arrangement, an upper portion of a cross section of the fluid connection is located at a first height;

connecting a heat exchanger to the static electric induction device tank;

providing the static electric induction device tank with an outlet that is arranged to lead the dielectric fluid to the heat exchanger and an inlet that is arranged to return the dielectric fluid from the heat exchanger to the static electric induction device tank; and locating the inlet at the same height or vertically above the first height as seen with respect to the vertical direction.

According to an example embodiment the method comprises arranging an accessory in the at least one opening of the accessory tank.

The static electric induction device may have an insulation material and the at least one opening, is arranged on a level above a second height defining a highest level of the insulation material. By this the accessory may be exchanged in an easier way and the insulation material will not be exposed to air. This will further support the reliability of the static electric induction arrangement.

According to an example embodiment the static electric induction arrangement may comprise an accessory arranged in the at least one opening on a level above a second height defining a highest level of the insulation material.

Further, the at least one opening, may be arranged in the top part of the accessory tank.

According to an example embodiment the static electric induction arrangement may comprise an accessory arranged in the at least one opening in the top part of the accessory tank.

Optionally the top part of the accessory tank may be located at about the same level or height as the top part of the static electric induction device tank in the vertical direction.

A partial barrier may be arranged in or at the fluid connection for at least partly preventing dielectric fluid from flowing in the fluid connection. This will further hinder hot dielectric fluid to enter the accessory tank and thereby avoid that the accessory is exposed to hot dielectric fluid from the electric static induction device tank.

The partial barrier may be made of an electrical non-conducting material. If the material is electrically conducting it may short-circuit the device by connecting the conductor to ground.

The partial barrier may comprise at least one material chosen from a cellulose based material, such as pressboard; or a polymer material, such as thermoset material, particularly epoxy resin. The epoxy resin may particularly be filled with inorganic material.

Fins or ribs may be arranged on the outside of the accessory tank. By this heat emission from the accessory tank will be increased.

An additional heat exchanger may be connected to the accessory tank. This will increase heat to be transported away from the accessory tank and the accessory tank will be cooled by means of the heat exchanger.

A heat barrier may be arranged on the outside of the static electric induction device tank or on the outside of the accessory tank between the static electric induction device tank and the accessory tank, wherein the heat barrier may be made of a thermally insulating material or a heat radiation hindering material. The thermally insulating material may be a polymer material and the heat radiation hindering material may be a metal. Heat radiation from the static electric induction device tank will then be hindered to be transferred to the accessory tank.

The accessory may be a tap changer, a current transformer, a cable termination or a bushing, such as a plug-in bushing, a dry bushing or an oil-filled bushing.

The accessory may be connected to a cable box or a GIS (Gas Insulated Switchgear) connection.

The dielectric fluid may comprise a high temperature liquid, wherein the high temperature liquid has a flash point temperature which is >160° C., preferably >190° C. or more preferably >250° C.; such as a liquid chosen from mineral oil, natural ester, synthetic ester and isoparaffinic liquid. If decreasing the weight and/or volume of the arrangement, higher temperature will be arrived at in the static electric induction device tank. Thereby it will be suitable to use dielectric fluids which withstand high temperatures.

When the static electric induction device is in use, the arrangement may be configured so that the dielectric fluid is circulated by natural convection only. The advantage with the effect of hindering hot dielectric fluid from entering the accessory tank will thus be possible with only natural convection which is more reliable since it does not depend on active cooling. The cooling system may thus be configured to fulfill required temperature limits at full load with passive cooling.

When the static electric induction device is in use, the arrangement may be constructed so that the dielectric fluid is circulated by a pump, such as by a pump arranged in the heat exchanger. This will improve the effect of hindering hot dielectric fluid from entering the accessory tank.

The heat exchanger of the static electric induction device tank may be arranged substantially above the static electric induction device tank with respect to the vertical direction. This has the effect to enhance the buoyancy and increase the circulation through the heat exchanger, thereby improving the cooling performance. For example, a part of the heat exchanger may be arranged above the static electric induction device tank. For example, at least 50% of the volume of the heat exchanger may be arranged above the static electric induction device tank. Further, at least 70% of the volume of the heat exchanger may be arranged above the static electric induction device tank or further at least 80% of the volume of the heat exchanger may be arranged above the static electric induction device tank. Further, the heat exchanger may be arranged completely above the static electric induction device tank.

The heat exchanger may be arranged at least partly above the top part of the static electric induction device tank.

The inlet may be arranged close to the top part of the static electric induction device tank.

The inlet may be arranged in direct vicinity to the fluid connection. A more compact construction may be obtained when the fluid connection of the accessory tank and the inlet are arranged close to each other. The accessory tank and the heat exchanger of the static electric induction device tank may for example be arranged on the same side of the static electric induction device tank.

The static electric induction arrangement may comprise more than one accessory tank as disclosed herein. The static electric induction arrangement may comprise one, two or three accessory tanks for example. The accessory tanks may be configured in the same way. However, the accessory tanks may be configured in different ways. Further, the accessory tanks may be configured in the static electric induction arrangement in the same way or in different ways.

The application of a static electric induction arrangement may be one of offshore energy systems, mobile emergency power transformers systems, renewable energy applications such as solar energy systems and onshore wind systems.

DETAILED DESCRIPTION OF SOME EMBODIMENTS

Figure 1:
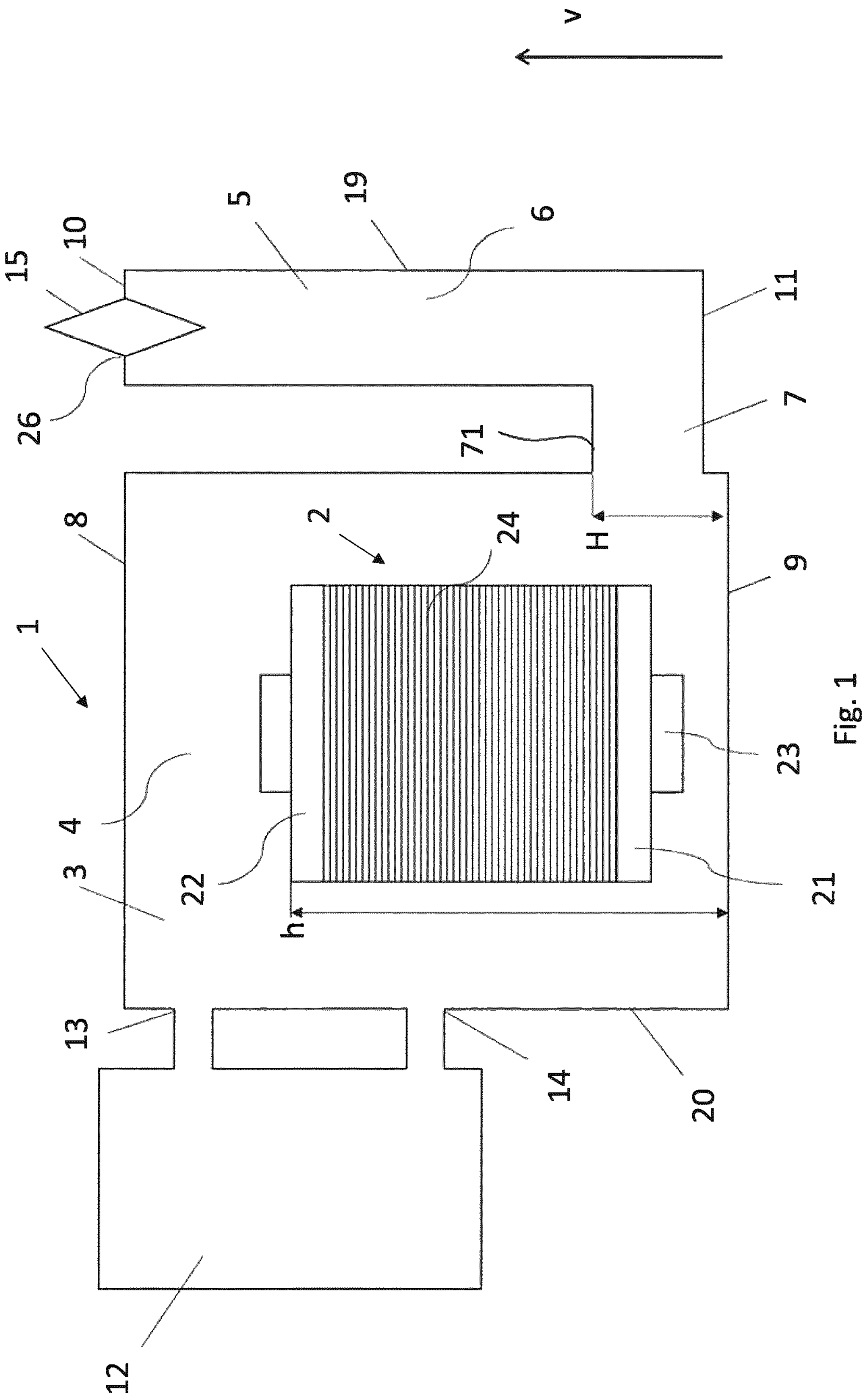
FIG. 1 discloses a schematic drawing of a static electric induction device arrangement according to the invention.

The invention will now be described more fully hereinafter with reference to the accompanying drawings. The invention may be in many different forms and should not be construed as limited to any embodiment disclosed herein or in the drawings. The embodiments are provided by way of example so that this disclosure will be thorough and complete, and will fully convey the scope of the invention to those skilled in the art. Like numbers refer to like elements throughout the description.

The invention refers to a static electric induction arrangement. A static electric induction arrangement comprises a static electric induction device arranged in a static electric induction tank. The static electric induction device is immersed in the tank comprising a dielectric fluid, which is an insulating medium and a cooling medium. Further, the arrangement comprises an accessory tank comprising at least one opening configured to receive an accessory therein. The static electric induction device generates heat during use. When the static electric induction device generates heat, the accessory will be exposed to heat and the insulation material of the accessory may be deteriorated. Further, it is desired that the accessory should not be exposed to the hot dielectric fluid generated in the static electric induction device tank. In fact, the accessory material may be more sensitive to heat than the material of the static electric induction device. Further, it is a desire to obtain a more compact static electric induction arrangement in order to save weight and volume. This may e.g., be advantageous when an arrangement needs to be moved long distances to the installation location or when an arrangement should be movable. In particular, for offshore applications such as offshore wind power generation or extraction of oil and gas, the size and weight of the equipment directly affects the cost and complexity of supporting structures and the platform that needs to be constructed in the marine environment. A decreased size of a static electric induction device may increase the current of the static electric induction device, which may generate losses and further means that the temperature in the dielectric liquid in the static electric induction device tank will increase.

In FIG. 1 is a static electric induction arrangement 1 according to the invention disclosed. The arrangement 1 comprises a static electric induction device tank 3 comprising a top part 8, a bottom part 9 and at least one wall 20 extending between the top part 8 and the bottom part 9, which is intended to be filled with dielectric fluid 4. The arrangement further comprises an accessory tank 5 comprising a top part 10, a bottom part 11 and at least one wall 19 extending between the top part 10 and the bottom part 11, which is intended to be filled with dielectric fluid 6. The accessory tank (5) further comprises at least one opening (26) configured to receive an accessory (15) therein. The arrangement 1 comprises a static electric induction device 2 arranged in the static electric induction device tank 3, wherein the static electric induction device tank 3 and the accessory tank 5 are connected via a fluid connection 7, wherein an upper portion 71 of a cross section of the fluid connection 7, as seen with respect to a vertical direction v of the static electric induction arrangement 1, is located at a first height H. The arrangement 1 comprises a heat exchanger 12 connected to the static electric induction device tank 3, the static electric induction device tank 3 comprises an outlet 13 that is arranged to lead the dielectric fluid 4 to the heat exchanger 12 and an inlet 14 that is arranged to return the dielectric fluid 4 from the heat exchanger 12 to the static electric induction device tank 3, wherein the inlet 14 is located at the same height or vertically above the first height H, as seen with respect to the vertical direction v.

According to an example embodiment the static electric induction arrangement 1 may comprise an accessory 15 arranged in the at least one opening 26 of the accessory tank 5.

The heat exchanger 12 may be in the form of a tube heat exchanger or a plate heat exchanger. Further, the heat exchanger 12 may be a radiator.

The dielectric fluid 4 in the static electric induction device 3 and the dielectric fluid 6 in the accessory tank 5 is the same.

For example, by the solution as disclosed herein, the inlet 14 and the first height H are positioned in such a way that, under the maximum long-time load of the static electric induction device 2, such as a transformer, the temperature of the fluid in the static electric induction device tank 3, in the vicinity of the first height H, is at least 10° C. lower than the temperature of the dielectric fluid 4 in the top of the static electric induction device tank 3, i.e. close to the top part 8 inside the static electric induction device tank 3.

By placing the accessory 15 in an accessory tank 5 externally from the static electric induction tank 3 in a separate compartment, the accessory 15 is placed in a cooler environment and the cooler environment in the accessory tank 5 is obtained by placing or locating the inlet 14 from the heat exchanger 12 into the static electric induction tank 3 at the same height or vertically above the first height H, as seen with respect to the vertical direction v. The inlet 14 provides the static electric induction tank 3 with return fluid from the heat exchanger 12 wherein the fluid has been cooled. The cooler dielectric fluid 4 entering via the inlet 14 will move downwards or in the side or horizontal direction while hotter dielectric fluid 4 which temperature has been increased by the static electric induction device 2 will move upwards towards the top of the static electric induction device tank 3. The hotter fluid has lower density and will move upwards. The cooler dielectric fluid will then be entering via the inlet 14 at the height H or will be entering via the inlet 14 above the height H and will move downwards in the direction to the height H. The cooler dielectric fluid will be in the area of the fluid connection 7 since hotter dielectric fluid will move away from the fluid connection 7 while cooler dielectric fluid 4 will stay or move towards the fluid connection 7 or the cross section of the fluid connection 7. Thus, hot dielectric fluid 4 will be avoided to be entering in the fluid connection 7. This allows for an increase of the temperature of the dielectric fluid 4 in the static electric induction device tank 3 without being limited by the thermal performance of the accessory 15. It is avoided that oil with high temperature is entering the accessory tank 5 and the accessory 15 will then be exposed to a lower temperature of the accessory tank 5. By allowing the increase of the temperature of the dielectric fluid 4 in the static electric induction device tank 3, without harm to the accessory 15, it is possible to design e.g., a transformer with lower weight and volume.

As stated above, the upper portion 71 of the cross section of the fluid connection 7, as seen with respect to the vertical direction v of the static electric induction arrangement 1, is located at a first height H. The first height H may be arranged on a level which is half the height or lower of the height of the static electric induction device tank 3 and above the bottom part 11 of the accessory tank 5.

The static electric induction device tank 3 and the accessory tank 5 may extend up to about the same level vertically above the bottom part 9 of the static electric induction tank.

The static electric induction device 2 comprises a core 23 and at least one winding 24. The core 23 and the at least one winding 24 produces heat during the use and it could for example be a transformer core and a transformer winding. Further, the static electric induction device 2 comprises an insulating material 21, 22. The top part and the bottom part of the insulating material 22, 21, respectively, can be seen in the figs. However, the insulating material extends throughout the height in the vertical direction v of the static electric induction device 2, but this is not disclosed in the figs.

The accessory 15 may be arranged in the at least one opening 26 of the accessory tank 5 wherein the opening 26 is arranged on a level above a second height h defining a highest level of the insulating material 21, 22, as seen with respect to a vertical direction. This has the advantage that the accessory 15 may be exchanged without exposing the static electric induction device 2 to air. If the dielectric fluid needs to be partially emptied from the tank and then refilled, exposing the static electric induction device insulating material, such as transformer insulation, requires the whole insulating material to undergo drying and vacuum impregnation. This is avoided by arranging the at least one opening 26 of the accessory tank 5 on a level above a second height h.

The accessory 15 may be releasably arranged in the at least one opening 26.

The accessory tank 5 may have more than one opening 26 for receiving an accessory 15 therein. One accessory 15 may be arranged in one opening 26. Thus, more than one accessory may be arranged in the accessory tank 5. Through the description one opening 26 with one accessory 15 arranged therein has been disclosed.

In some arrangements already used today, which do not have separate accessory tanks, the accessories are arranged in the top of the static electric induction device tank. Placing the accessory near the top of the static electronic induction device tank expose/s it/them to the top temperature of the dielectric fluid. The hotter oil will move to the top of the static electronic induction device tank and this will be the part of the arrangement with the highest temperature of the oil. This means that the maximum permissible temperature of an accessory limits the maximum temperature of the top dielectric fluid. By the solution herein, with the accessory arranged in the accessory tank 5 and having the inlet 14 located at the same height or vertically above the first height H, and when the opening 26 is on a level above a second height h defining a highest level of the insulation material, an accessory 15 standing lower temperatures may be used. It will be possible to exchange the accessory 15 if needed without exposing the insulating material to air. Thus, the dielectric liquid will not be needed to be emptied below the height exposing the insulation material when exchanging the accessory.

The accessory 15 is arranged in the accessory tank 5 and the inlet 14 may be located at the same height or vertically above the first height H. This will hinder hot oil from entering the accessory 5 tank and the temperature of the oil in the static electric induction device tank 3 may then be higher since the hot oil will not enter the accessory tank 3. This makes it possible to design e.g., a transformer with lower weight and volume.

The accessory 15 may be arranged in the at least one opening 26 of the top part 10 of the accessory tank 5.

The top part 10 of the accessory tank 5 may be located at about the same level or height as the top part 8 of the static electric induction device tank 3 in the vertical direction v.

The highest level or height of the accessory tank 5 may extend to the highest level or height of the static electric induction tank 3 and if the opening 26 is arranged above a second height h defining the highest level of the insulating material 21, 22 easy replacement of the accessory 15 can be achieved. Further, the height of the accessory tank 5 may be at the same level as the height of the static electric induction device tank 3.

The accessory 15 may extend below the at least one opening 26 of the accessory tank 5. A bushing may for example extend through the opening 26 and below the opening 26. The accessory 15 may be at least partly immersed in the accessory tank 5.

Figure 2:
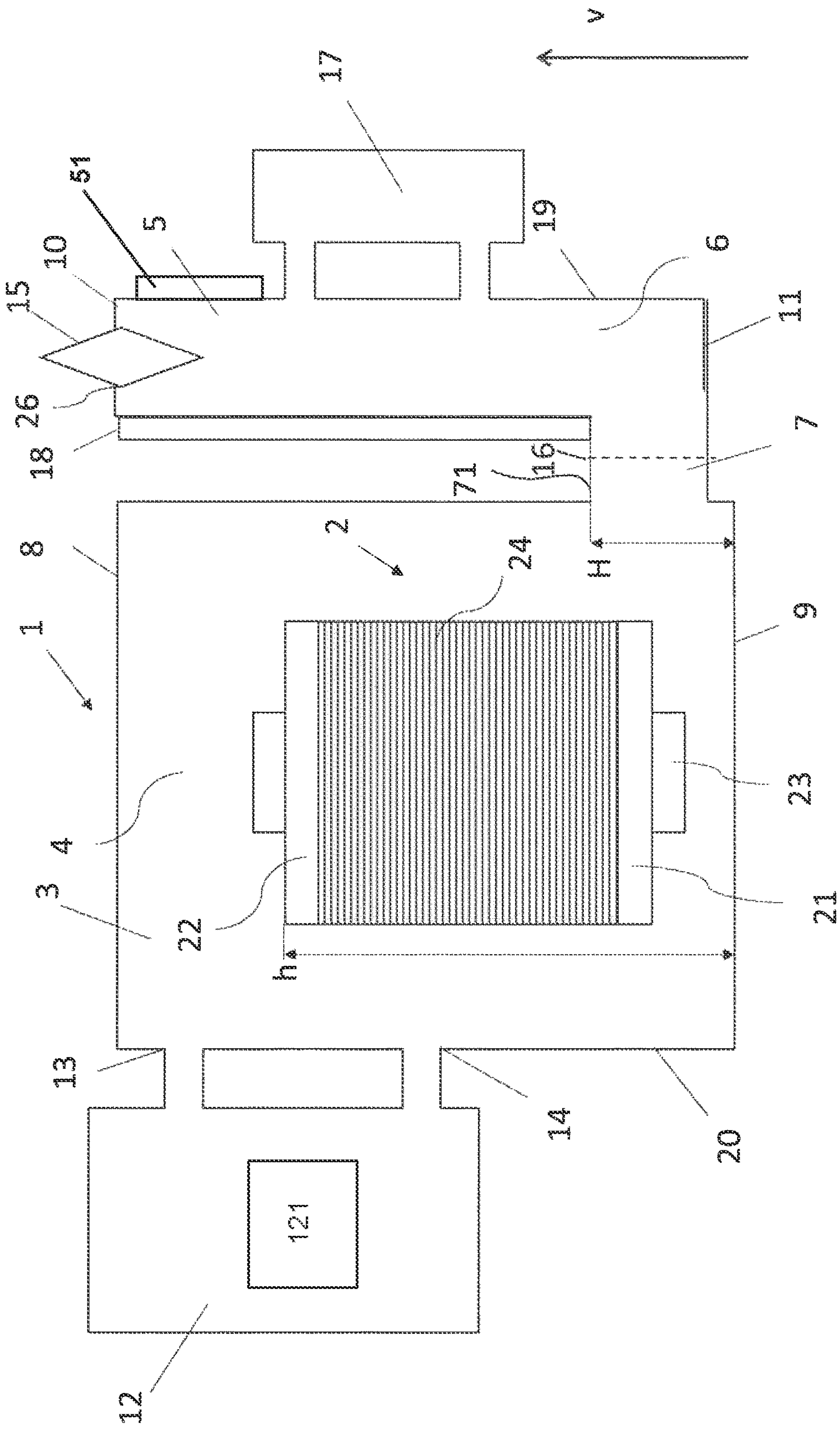
FIG. 2 discloses a schematic drawing of another static electric induction device arrangement according to the invention.

It is now referred to FIG. 2. A static electric induction device 2 is disclosed. A static electric induction device tank 3 is disclosed which is in fluid connection 7 with an accessory tank 5. A static electric induction device 2 is arranged in the static electric induction device tank 3. A heat exchanger 12 is connected to the static electric induction device tank 3, wherein the heat exchanger 12 is connected to the static electric induction device tank 3 via an inlet 14 and an outlet 13 arranged to lead the fluid into and out from the static electric induction device tank 3. The fluid connection 7 has a cross section which has an upper portion 71 at a first height H. The inlet 14 is arranged at the same level or at a level above the first height H.

A partial barrier 16 may be arranged in or at the fluid connection 7 for at least partly preventing dielectric fluid 4 from flowing in the fluid connection. This will avoid that any hot dielectric fluid 4 will enter into the accessory tank 5. A schematic barrier 16 is disclosed in FIG. 2.

The partial barrier 16 may comprise at least one material chosen from a cellulose based material, such as pressboard; or a polymer material, such as thermoset material, particularly epoxy resin. The material may be porous for the dielectric liquid to pass slowly through the partial barrier 16.

Fins or ribs 51 may be arranged on the outside of the accessory tank 5 (not shown) for instance as shown in FIG. 2. Fins or ribs 51 will cool the accessory tank 5 which further increases the possibility for the accessory 15 to not be exposed to high temperatures. The accessory 15 may also contribute to increased temperature in the accessory tank 5. The fins or ribs 51 may then advantageously cool the dielectric fluid in the accessory tank 5 by leading heat away from the accessory tank 5.

FIG. 2 discloses an additional heat exchanger 17 which may be connected to the accessory tank 5. This will cool the accessory tank 5 in a quite effective way if needed to have extra cooling of the accessory tank 5. The heat exchanger 17 may be in the form of a tube heat exchanger or a plate heat exchanger.

A heat barrier 18 may be arranged on the outside on the static electric induction device tank 3 or on the outside of the accessory tank 5 between the static electric induction device tank 3 and the accessory tank 5. The heat barrier 18 may be made of a thermally insulating material or a heat radiation hindering material. The thermally insulating material may be a polymer material and the heat radiation hindering material may be a metal. The heat barrier 18 will hinder heat from being transferred from the static electric induction device tank 3 to the accessory tank 5. There may be a desire to have the outside of the static electric induction device tank 3 free from any additional material in order to let the outside air circulate freely from the static electric induction device tank 3 and in such a case the thermally insulation material or a heat radiation material is arranged on the outside of the accessory tank 5.

The accessory 15 may be a tap changer, a current transformer, a cable termination or a bushing, such as a plug-in bushing, a dry bushing or an oil-filled bushing. Those are examples of accessories which may be used in a static electric induction arrangement or in a transformer arrangement.

The accessory 15 may be connected to a cable box or a Gas Insulated Switchgear (GIS) connection.

The dielectric fluid 4, 6 comprises a high temperature liquid, wherein the high temperature liquid has a flash point temperature which is >160° C., preferably >190° C. or more preferably >250° C.; such as a liquid chosen from mineral oil, natural ester, synthetic ester and isoparaffinic liquid. When decreasing the size of the static electric induction device 2 the temperature of the dielectric fluid will increase. A smaller static electric induction device 2 will increase the current of the device, which will increase the losses leading to increased temperature. A high temperature liquid will be suitable to use in the static electric induction device tank 3.

When a smaller static electric induction device 2 is arranged in the tank 3 it will still be possible to use an accessory which may not withstand high temperatures obtained in the static electric induction device tank 3. Accessories, such as bushings may withstand oil temperatures of up to about 90° C. When the static electric induction device tank 3 as disclosed herein is decreased in size, a temperature of the dielectric fluid in the top of the tank 3 may be up to about 130° C. However, if the oil or dielectric fluid in the accessory tank 5 has a temperature below 115° C., or below 110° C. or below 90° C. it would be acceptable for bushings as mentioned above. Dry bushings have insulation materials of e.g. epoxy. Such bushings are more sensitive to high temperatures. The material becomes mechanically weak in the temperature range of dielectric fluid in a static electric induction device tank. Oil-paper bushings can withstand high temperature during a short time, but will undergo thermal ageing if exposed to high temperature over extended periods of time.

The temperature of dielectric fluid in the accessory tank may be below 115° C., or below 110° C. or below 90° C. The temperature difference between the dielectric fluid in the top of the static electric induction tank 5 and in the top of the accessory tank 3 may be at least 10° C., or at least 20° C. or at least 40° C.

When the static electric induction device 2 is in use, the arrangement may be constructed so that the dielectric fluid is circulated by natural convection only. Passive cooling may be more reliable and does not require maintenance and is particularly good for application in the remote areas. No energy would be needed for operating the cooling system, which may be the heat exchanger 12 in combination with a pump 121 for example as shown in FIG. 2. The arrangement 1 is configured so that the dielectric fluid 4 is circulated by natural convection and fulfils the required temperature limits at full load with passive cooling.

When the static electric induction device 2 is in use, the arrangement 1 may be configured so that the dielectric fluid is circulated by a pump 121 for instance as shown in FIG. 2, such as by a pump 121 arranged in the heat exchanger 12. A more effective hindering of hot dielectric fluid to enter the accessory tank 5 may be achieved. Natural convection effects may still have to be considered, so that the cooling system is configured to operate in a mixed convection regime rather than a pure forced convection regime.

Figure 3:
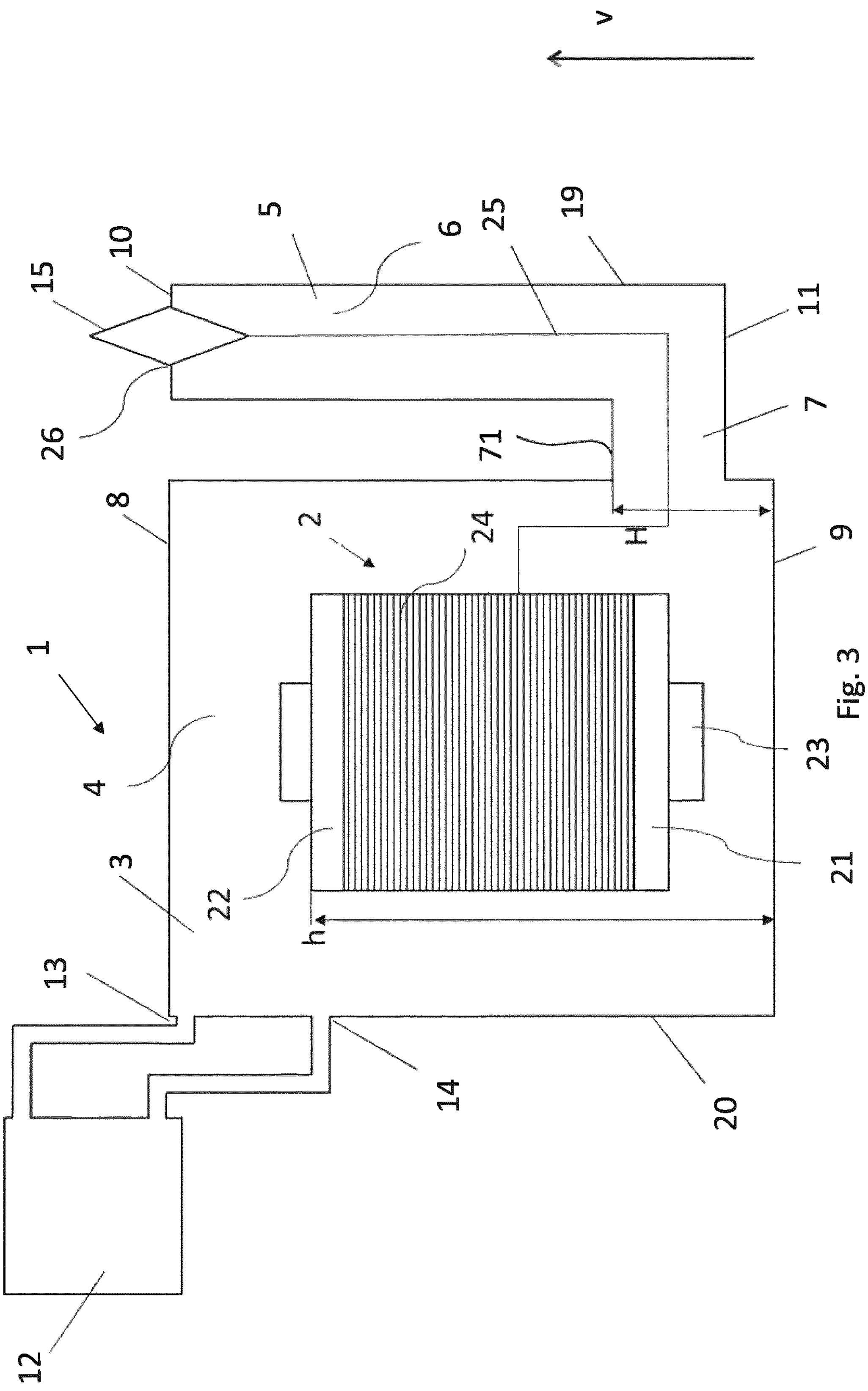
FIG. 3 discloses a schematic drawing of another static electric induction device arrangement according to the invention.

It is now referred to FIG. 3. FIG. 3 shows an embodiment where the heat exchanger 12 of the static electric induction device tank 3 is arranged substantially above the static electric induction device tank 3, as seen with respect to a vertical direction v. The heat exchanger 12 may be arranged at least partly above the top part 8 of the static electric induction device tank 3. This placement will enhance the buoyancy and increase the circulation through the heat exchanger, thereby improving the cooling performance. As mentioned above, for example a part of the heat exchanger 12 may be arranged above the static electric induction device tank 3. For example, at least 50% of the volume of the heat exchanger 12 may be arranged above the static electric induction device tank 3. Further, at least 70% of the volume of the heat exchanger 12 may be arranged above the static electric induction device tank 3 or further at least 80% of the volume of the heat exchanger 12 may be arranged above the static electric induction device tank 3. Further, the heat exchanger 12 may be arranged completely above the static electric induction device tank 3. Other features of the embodiment shown in FIG. 3 may be similar as features shown with respect to e.g., FIGS. 1 and 2.

The static electric induction arrangement 1 may comprise more than one accessory tank 5 as disclosed herein. The arrangement 1 may for example comprise two accessory tanks 5 or the arrangement may comprise three accessory tanks 5. Further, the arrangement may comprise several more accessory tanks, such as 4, 5, 6 or 7 accessory tanks 5. In FIG. 1-3 only one accessory tank 5 is shown. The accessory tanks may be configured in the same way. Further the accessory tanks 5 may be configured in different ways. The same purpose is to obtain a static electric induction arrangement 1 wherein a low weight a low volume static electric induction arrangement 1 is obtained for example. Further, the accessory tanks 5 are configured in the static electric induction arrangement in the same way. In addition, the accessory tanks 5 may be configured in the static electric induction arrangement in a different way. Through the description and figures mainly arrangements comprising one accessory tank 5 is described, but several accessory tanks 5 are possible as disclosed above.

A three phase transformer has three bushings on the high voltage side, which may be arranged in three accessory tanks, and three bushings on the low voltage side, which may be arranged in three further accessory tanks, for a total of six accessory tanks. A tap changer may be arranged in a further accessory tank. Thus, a static electric induction arrangement 1, comprising a transformer device, may have seven accessory tanks 5. Each accessory tank comprises an accessory, which may be a bushing or a tap changer.

Application comprising the static electric induction arrangement as disclosed herein may be one of offshore energy systems, mobile emergency power transformers systems, renewable energy applications such as solar energy systems and onshore wind systems. Application of renewable energy applications such as solar and onshore wind, which have large load variations are suitable. The temperature may vary during the load variations. In a small size static electric induction device as disclosed herein it is possible to withstand high temperatures which may be obtained when the load varies in the application. The arrangement 1 disclosed herein can withstand high temperatures. Thus, the arrangement as disclosed herein is advantageous for applications which have large load variations. An advantage is that the arrangement will be easier to transport and less material will be used.

A benefit of the invention is that it allows the dielectric fluid temperature in the static electric induction tank 3, such as oil temperature, to be increased beyond the thermal limit of the accessory 15. By increasing the allowed dielectric fluid temperature, a much more compact static electric induction device design can be utilized decreasing both weight and volume. For certain applications such as offshore or mobile emergency transformers, a significant decrease in weight and volume provides a customer benefit large enough to offset the extra cost of building the accessory tank 5.

In FIG. 3 is a cable 25 disclosed, for illustration, which connects the accessory 15 with the static electric induction device 2.

Disclosed herein in is also a method to limit or prevent overheating of an accessory 15 in a static electric induction arrangement 1. The method comprises the steps of: providing a static electric induction device tank 3, comprising a top part 8, a bottom part 9 and at least one wall 20 extending between the top part 8 and the bottom part 9, which is intended to be filled with dielectric fluid 4; providing an accessory tank 5, comprising a top part 10, a bottom part 11 and at least one wall 19 extending between the top part 10 and the bottom part 11 which is intended to be filled with dielectric fluid 6, providing at least one opening 26 in the accessory tank 5 wherein the opening 26 is configured to receive an accessory 15 therein; providing a static electric induction device 2 arranged in the static electric induction device tank 3. The method further comprises:

providing a fluid connection 7 between the static electric induction device tank 3 and the accessory tank 5, and as seen with respect to a vertical direction v of the static electric induction arrangement 1, an upper portion of a cross section of the fluid connection 7 is located at a first height H;

connecting a heat exchanger 12 to the static electric induction device tank 3;

providing the static electric induction device tank 3 with an outlet 13 that is arranged to lead the dielectric fluid 4 to the heat exchanger 12 and an inlet 14 that is arranged to return the dielectric fluid 4 from the heat exchanger 12 to the static electric induction device tank 3. Further, the method comprises locating the inlet 14 at the same height or vertically above the first height H as seen with respect to the vertical direction v.

According to an example embodiment the method comprises arranging an accessory 15 in the at least one opening 26 of the accessory tank 5.

Further, there may be a fluid connection between the accessory tank 5 and the transformer tank 3 that is arranged higher than the inlet 14 that allows fluid communication. Such a connection is in addition to the fluid connection 7. The additional fluid connection may avoid that air pockets are formed in the accessory tank when filling it with dielectric fluid. The connection may be configured to avoid heat transfer between fluid near the top part or ceiling of the static electric induction device tank 3 and fluid near the top part or ceiling of the accessory tank 5. This can be achieved by having a valve that blocks the flow from the static electric induction device tank 3, or by making the connection long and thin enough so that fluid from the top of the static electric induction tank would cool down before reaching the accessory tank 5.

The method to limit or prevent overheating of an accessory in a static electric induction arrangement 1, wherein the static electric induction device 2 has an insulation material 21, 22, may comprise the step of: providing the at least one opening 26 on a level above a second height h defining a highest level of the insulation material 21, 22.

Further, the method may comprise providing at least one opening 26 in the top part 10 of the accessory tank 5.

The method may further comprise a step of: providing a partial barrier 16 in or at the fluid connection 7 for at least partly preventing dielectric fluid from flowing in the fluid connection.

The method may further comprise a step of: providing fins or ribs on the outside of the accessory tank.

Further, the method may comprise the step of: connecting an additional heat exchanger 17 to the accessory tank 5.

The method may comprise the step of: providing a heat barrier 18 on the outside on the static electric induction device tank 3 or on the outside of the accessory tank 5 between the static electric induction device tank and the accessory tank.

The method may further comprise the step of circulating the dielectric fluid by natural convection only.

Further, the method may comprise the step of: circulating the dielectric fluid by a pump, such as a pump arranged in the heat exchanger.

The method may comprise the step of: providing the heat exchanger substantially 12 above the static electric induction device tank 3.

The static electric induction device arrangement, the application and the method disclosed herein may be particularly useful for a power transformer with voltage levels of 66 kV or higher. The static electric induction device may be a power transformer with voltage levels of 66 kV or higher.

Embodiments of the present invention may be described in any one of the following points.

1. A static electric induction arrangement 1 comprising:
   - a static electric induction device tank 3 comprising a top part 8, a bottom part 9 and at least one wall 20 extending between the top part 8 and the bottom part 9, which is intended to be filled with dielectric fluid 4;
   - an accessory tank 5 comprising a top part 10, a bottom part 11 and at least one wall 19 extending between the top part 10 and the bottom part 11, which is intended to be filled with dielectric fluid 6, the accessory tank 5 further comprising at least one opening 26 configured to receive an accessory 15 therein;
   - a static electric induction device 2 arranged in the static electric induction device tank 3,
   - wherein the static electric induction device tank 3 and the accessory tank 5 are connected via a fluid connection 7, wherein an upper portion 71 of a cross section of the fluid connection 7, as seen with respect to a vertical direction v of the static electric induction arrangement, is located at a first height H, characterized in that the arrangement comprises a heat exchanger 12 connected to the static electric induction device tank 3, the static electric induction device tank comprises an outlet 13 that is arranged to lead the dielectric fluid 4 to the heat exchanger 12 and an inlet 14 that is arranged to return the dielectric fluid 4 from the heat exchanger 12 to the static electric induction device tank 3, wherein the inlet 14 is located at the same height or vertically above the first height H, as seen with respect to the vertical direction v.

2. The static electric induction arrangement according to point 1, characterized in that the static electric induction device has an insulation material 21, 22 and the at least one opening 26, is arranged on a level above a second height h defining a highest level of the insulation material.
3. The static electric induction arrangement according to any of points 1 or 2, characterized in that the at least one opening 26, is arranged in the top part 10 of the accessory tank 5.
4. The static electric induction arrangement according to any of the preceding points, characterized in that a partial barrier 16 is arranged in or at the fluid connection 7 for at least partly preventing dielectric fluid from flowing in the fluid connection.
5. The static electric induction arrangement according to any of the preceding points, characterized in that fins or ribs are arranged on the outside of the accessory tank 5.
6. The static electric induction arrangement according to any of the preceding points, characterized in that an additional heat exchanger 17 is connected to the accessory tank 5.
7. The static electric induction arrangement according to any of the preceding points, characterized in that a heat barrier 18 is arranged on the outside on the static electric induction device tank 3 or on the outside of the accessory tank 5 between the static electric induction device tank 3 and the accessory tank 5, wherein the heat barrier 18 may be made of a thermally insulating material or a heat radiation hindering material.
8. The static electric induction arrangement according to any of the preceding points, characterized in that the accessory 15 is a tap changer, a current transformer, a cable termination or a bushing, such as a plug-in bushing, a dry bushing or an oil-filled bushing.
9. The static electric induction arrangement according to any of the preceding points, characterized in that the accessory 15 is connected to a cable box or a GIS connection.
10. The static electric induction arrangement according to any of the preceding points, characterized in that the dielectric fluid 4, 6 comprises a high temperature liquid, wherein the high temperature liquid has a flash point temperature which is >160° C., preferably >190° C. or more preferably >250° C.; such as a liquid chosen from mineral oil, natural ester, synthetic ester and isoparaffinic liquid.
11. The static electric induction arrangement according to any of the preceding points, characterized in that, when the static electric induction device 2 is in use, the arrangement is constructed so that the dielectric fluid is circulated by natural convection only.
12. The static electric induction arrangement according to any of the points 1-10, characterized in that, when the static electric induction device 2 is in use, the arrangement is constructed so that the dielectric fluid is circulated by a pump, such as by a pump arranged in the heat exchanger 12.
13. The static electric induction arrangement according to any of the preceding points, characterized in that the heat exchanger 12 of the static electric induction device tank 3 is arranged substantially above the static electric induction device tank with respect to the vertical direction v.
14. Application of a static electric induction arrangement according to any of the preceding points, wherein the application is one of offshore energy systems, mobile emergency power transformers systems, renewable energy applications such as solar energy systems and onshore wind systems.
15. A method to limit or prevent overheating of an accessory 15 in a static electric induction arrangement 1, wherein the method comprises the steps of:

providing a static electric induction device tank 3, comprising a top part 8, a bottom part 9 and at least one wall 20 extending between the top part 8 and the bottom part 9, which is intended to be filled with dielectric fluid 4;

providing an accessory tank 5, comprising a top part 10, a bottom part 11 and at least one wall 19 extending between the top part 10 and the bottom part 11, which is intended to be filled with dielectric fluid 6;

providing at least one opening 26 in the accessory tank 5 wherein the opening 26 is configured to receive an accessory 15 therein;

providing a static electric induction device 2 arranged in the static electric induction device tank 3;

providing a fluid connection 7 between the static electric induction device tank 3 and the accessory tank 5, and as seen with respect to a vertical direction v of the static electric induction arrangement, an upper portion 71 of a cross section of the fluid connection 7 is located at a first height H; and connecting a heat exchanger 12 to the static electric induction device tank 3; providing the static electric induction device tank with an outlet 13 that is arranged to lead the dielectric fluid 4 to the heat exchanger 12 and an inlet 14 that is arranged to return the dielectric fluid 4 from the heat exchanger 12 to the static electric induction device tank 3;

and locating the inlet 14 at the same height or vertically above the first height H as seen with respect to the vertical direction v.

The invention claimed is:

1. A static electric induction arrangement comprising:

a static electric induction device tank comprising a top part, a bottom part and at least one wall extending between the top part and the bottom part, which is for accommodating a dielectric fluid;

an accessory;

an accessory tank comprising a top part, a bottom part and at least one wall extending between the top part and the bottom part, which is for accommodating the dielectric fluid, the accessory tank further comprising at least one opening arranged in the top part of the accessory tank to receive the accessory therein;

a fluid connection part for accommodating the dielectric fluid;

a heat exchanger for accommodating the dielectric fluid;

an outlet for accommodating the dielectric fluid; and an inlet for accommodating the dielectric fluid;

a static electric induction device arranged in the static electric induction device tank, wherein the static electric induction device tank is in fluid connection with the accessory tank via the fluid connection part, wherein an upper portion of the fluid connection part, with respect to the bottom part of the static electric induction device tank in a vertical direction of the static electric induction arrangement, is located at a first height, wherein the heat exchanger is in fluid connection with the static electric induction device tank via the outlet and the inlet, wherein the outlet is arranged to lead the dielectric fluid from the static electric induction device tank to the heat exchanger, wherein the inlet is arranged to return the dielectric fluid from the heat exchanger to the static electric induction device tank, wherein a top part of a section of the inlet adjacent to the static electric induction device tank, with respect to the bottom part of the static electric induction device tank in the vertical direction, is located at a second height the same as or larger than the first height, wherein a top part of a section of the outlet adjacent to the static electric induction device tank, with respect to the bottom part of the static electric induction device tank in the vertical direction, is located at a third height larger than the second height, wherein the top part of the static electric induction device tank, with respect to the bottom part of the static electric induction device tank in the vertical direction, is located at a fourth height larger than the third height, wherein a top part of the heat exchanger, with respect to the bottom part of the static electric induction device tank in the vertical direction, is located at a fifth height larger than the fourth height, and wherein the static electric induction device comprises an insulation material, wherein the insulation material, with respect to the bottom part of the static electric induction device tank in the vertical direction, is located at a sixth height, and wherein the at least one opening, with respect to the bottom part of the static electric induction device tank in the vertical direction, is located at a seventh height larger than the sixth height.

2. The static electric induction arrangement according to claim 1, wherein the static electric induction device further comprises another insulation material, and wherein the another insulation material, with respect to the bottom part of the static electric induction device tank in the vertical direction, is located at an eighth height smaller than the sixth height.

3. The static electric induction arrangement according to claim 1, wherein the accessory is releasably arranged in the at least one opening.

4. The static electric induction arrangement according to claim 1, further comprising a partial barrier arranged in or at the fluid connection part for at least partly preventing dielectric fluid from flowing from the static electric induction device tank through the fluid connection into the accessory tank.

5. The static electric induction arrangement according to claim 1, further comprising fins or ribs arranged on an outside of the accessory tank.

6. The static electric induction arrangement according to claim 1, further comprising an additional heat exchanger in fluid connection with the accessory tank.

7. The static electric induction arrangement according to claim 1, further comprising a heat barrier arranged on an outside of the static electric induction device tank or on an outside of the accessory tank between the static electric induction device tank and the accessory tank, wherein the heat barrier is made of a thermally insulating material or a heat radiation hindering material.

8. The static electric induction arrangement according to claim 1, wherein the accessory is a tap changer, a current transformer, a cable termination, a bushing, a plug-in bushing, a dry bushing, or an oil-filled bushing.

9. The static electric induction arrangement according to claim 1, wherein the accessory is connected to a cable box or a GIS connection.

10. The static electric induction arrangement according to claim 1, wherein the dielectric fluid comprises a high temperature liquid, wherein the high temperature liquid has a flash point temperature which is >160° C., >190° C. or >250° C., and wherein the high temperature liquid is chosen from mineral oil, natural ester, synthetic ester and isoparaffinic liquid.

11. The static electric induction arrangement according to claim 1, wherein when the static electric induction device is in use, the dielectric fluid is circulated by natural convection.

12. The static electric induction arrangement according to claim 1, further comprising a pump arranged in the heat exchanger, wherein when the static electric induction device is in use, the dielectric fluid is circulated by the pump.

13. An application of the static electric induction arrangement according to claim 1, wherein the application is one of offshore energy systems, mobile emergency power transformers systems, renewable energy systems, solar energy systems, and onshore wind systems.

* * * * *